United States Patent [19]

Katae et al.

[11] Patent Number: 4,932,828
[45] Date of Patent: Jun. 12, 1990

[54] AUTOMATIC ARTICLE FEEDING SYSTEM

[75] Inventors: Yoshinobu Katae; Yusaku Azuma, both of Kanagawa, Japan

[73] Assignee: Canon Kabushiki Kaisha, Tokyo, Japan

[21] Appl. No.: 306,260

[22] Filed: Feb. 3, 1989

Related U.S. Application Data

[63] Continuation of Ser. No. 903,412, Sep. 3, 1986, abandoned.

[30] Foreign Application Priority Data

Sep. 4, 1985 [JP] Japan ................. 60-195594
Aug. 27, 1986 [JP] Japan ................. 61-200949
Aug. 27, 1986 [JP] Japan ................. 61-200950

[51] Int. Cl.⁵ ......................................... B65G 1/06
[52] U.S. Cl. ................... 414/286; 414/331; 414/281; 414/278; 414/280; 414/661; 414/416; 414/797.8; 414/273; 364/478
[58] Field of Search ............... 414/273, 274, 275, 276, 414/277, 278, 279, 280, 281, 282, 283, 284, 285, 286, 331, 416, 417, 799, 661, 797.8, 797.5; 364/478

[56] References Cited

U.S. PATENT DOCUMENTS

| | | |
|---|---|---|
| 3,526,326 | 9/1970 | Castaldi . |
| 3,610,445 | 10/1971 | Kitchen et al. ............. 414/278 |
| 3,782,565 | 1/1974 | Doran et al. ............. 414/281 X |
| 3,858,732 | 1/1975 | Kemper .................... 414/127 |
| 3,883,008 | 5/1975 | Castaldi ................ 414/280 X |
| 3,883,013 | 5/1975 | Nakanishi et al. ......... 414/281 |
| 4,007,846 | 2/1977 | Pipes .................. 414/280 X |
| 4,588,341 | 5/1986 | Motoda ................ 414/331 X |
| 4,651,863 | 3/1987 | Reuter ................. 414/283 X |
| 4,671,723 | 6/1987 | Feldkämper .............. 414/114 |
| 4,678,390 | 7/1987 | Bonneton et al. ........ 414/285 X |

FOREIGN PATENT DOCUMENTS

| | | |
|---|---|---|
| 1811635 | 6/1970 | Fed. Rep. of Germany ...... 414/281 |
| 55-28665 | 7/1955 | Japan . |
| 49-8752 | 2/1974 | Japan . |
| 52-26391 | 7/1977 | Japan . |
| 54-1750 | 1/1979 | Japan . |
| 137230 | 8/1982 | Japan ................. 414/37 |
| 59-4502 | 1/1984 | Japan . |
| 36003 | 2/1984 | Japan ................. 414/280 |

Primary Examiner—Frank E. Werner
Attorney, Agent, or Firm—Fitzpatrick, Cella, Harper & Scinto

[57] ABSTRACT

An automatic article feeding system which includes a conveyor for conveying pallets each of which contains an article or articles such as parts to be assembled and has a mark indicating the kind of article or articles contained therein, having a feeder for feeding each of the conveyed pallets into one of the shelves of the stocker according to empty shelf information supplied by an information processing unit; a memory for storing the address of the shelf in which the pallet has been stocked and further storing information of the kinds of articles on the pallet; a searcher for searching the memory according to the instruction received from the automatic assembling machine to detect the existence or non-existence of the article required by the automatic assembling machine and, if in existence, detect the address of the shelf in which the required article is stocked; a system for withdrawing the pallet from the stocker according to such detection; a feeder for feeding the pallet to a position for supplying the article contained therein to the automatic assembling machine; a device for returning the pallet, after supplying the article to the automatic assembling machine, to the original shelf of the stocker; a storer for storing the number of the articles retained in the stocker and the existence or non-existence of articles after supplying the article into the memory through the information processing unit; a displayer for displaying the number and the existence or non-existence of articles; and a discharger for discharging an empty pallet, from which all of the articles have been completely supplied to the automatic assembling machine, from the stocker and feeding a new pallet containing articles to the stocker.

5 Claims, 10 Drawing Sheets

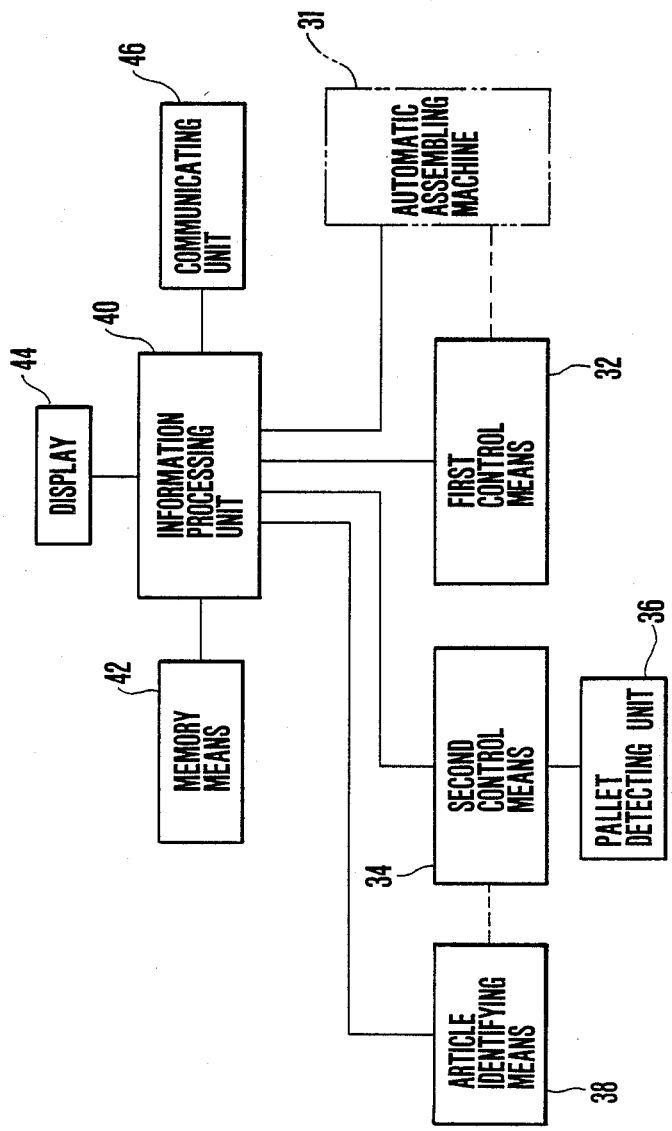
F I G. 8

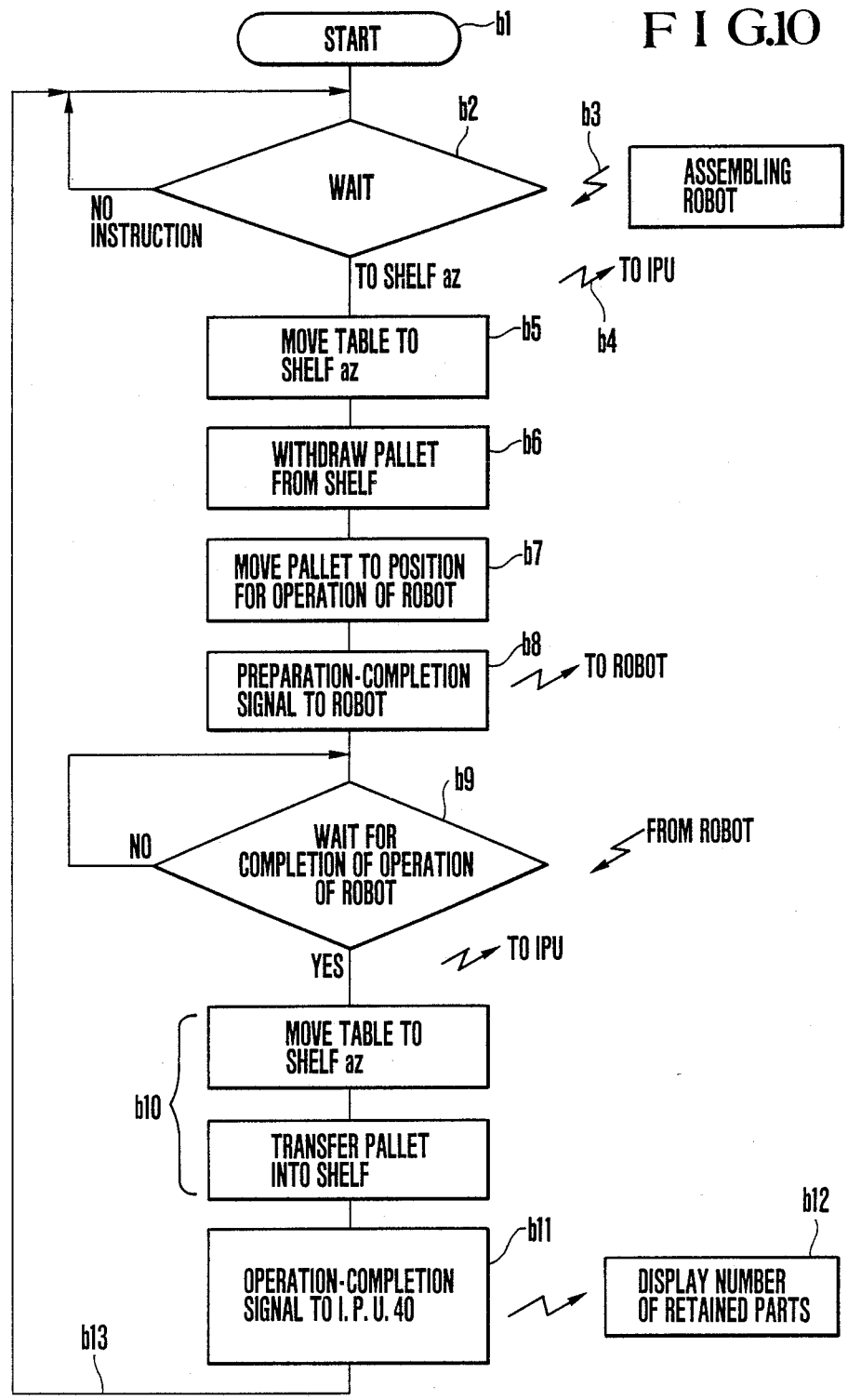

AUTOMATIC ARTICLE FEEDING SYSTEM

This application is a continuation of application Ser. No. 903,412, filed Sept. 3, 1986, now abandoned.

BACKGROUND OF THE INVENTION

1. Field of the Invention

The present invention relates to an automatic article feeding system for successively feeding many kinds of articles into a stocker to temporarily stock them in said stocker and withdrawing and feeding the articles from said stocker to an automatic assembling machine, such as a robot, according to an instruction received from said automatic assembling machine.

More particularly, the present invention relates to an automatic article feeding system which includes means for conveying pallets each of which contains an article or articles such as parts to be assembled and has a mark indicating the kind of the article or articles contained therein, and comprises; means for feeding each of the conveyed pallets into one of the shelves of the stocker according to an empty shelf information supplied by an information processing unit; memory means for storing an address of the shelf in which said pallet has been stocked and further storing information of the kind of the article or articles of said pallet; means for searching the memory means according to the instruction received from the automatic assembling machine to detect existence or non-existence of the article required by the automatic assembling machine and, if in existence, detect the address of the shelf in which the required article is stocked; means for withdrawing the pallet from the stocker according to such detection; means for feeding said pallet to a position for supplying the article contained therein to the automatic assembling machine; means for returning the pallet, after supplying the article to the automatic assembling machine, to the original shelf of the stocker; means for storing the number of the articles retained in the stocker and the existence or non-existence of articles after supplying the article, into the memory means through the information processing unit; display means for displaying the number and the existence or non-existence of articles; and means for discharging an empty pallet, from which all of the articles have been completely supplied to the automatic assembling machine, from the stocker and feeding a new pallet containing an article or articles to the stocker.

Description of the Related Art

Recently, rapid advances have been made in automatic assembling techniques and, accordingly, many articles have become manufactured in an automatic assembling system.

With reference to conveying method of products during assembly, the automatic assembling equipment can be classified into a line production system and a non-line production system. The line production system consists of a line for conveying products during assembly and a plurality of automatic assembling machines arranged along said conveying line, as is well known in the art. The line production system is mainly used in production of large quantity and few kinds of articles in which a great number of assembling steps are involved and equipment investment per one kind of article can be greatly increased.

The non-line production system is mainly used, for example, when the quantity of production is small, when the product is not adaptable to a conveyor system, when a relatively small number of assembling steps are involved, or when it is not preferable to greatly increase the equipment investment.

In case of the automatic assembling equipment according to the line production system, which is frequently used in mass-production systems, the speed of conveying products during assembly is high and, consequently, the automatic assembling machines arranged along the assembly line are mainly constructed of high-speed and single-function machines. Furthermore, in case of this equipment, it is general practice to effect assembling operation of one kind of parts at one assembling station and to arrange a device for supplying the parts for assembly at every one of the assembling stations, so that the control of the device for supplying the parts is relatively simple.

On the other hand, in case of the automatic assembling equipment according to the non-line production system, which includes no conveying line for conveying products during assembly or a very short length of such conveying line, if any, the automatic assembling equipment used is frequently constructed of a robot which can effect various kinds of operations. The automatic assembling equipment according to this system has some advantages. That is, many different kinds of products can be assembled by the same equipment if software used to control the robot is changed, depending upon the product to be assembled, and the floor space occupied by the equipment can be decreased, as compared with the line production system. Accordingly, the automatic assembling equipment according to the non-line production system is suitable to production of small quantity and many kinds of articles. In order to adapt this equipment to production of large quantity and many kinds of articles it is necessary to feed many kinds of parts for assembly to one robot, with the result that it is necessary to arrange a great number of feeding apparatus for feeding parts for assembly around said one robot. Accordingly, circumstances surrounding said robot become confused, and the floor space occupied by the equipment and the overall size of the equipment are increased owing to the existence of many feeding apparatus.

Under such circumstances, in case of the automatic assembling machine according to the non-line production system, it is desirable to construct the automatic article feeding device for feeding parts for assembly in a compact size as far as possible and to construct said device in such form that many kinds of parts can be fed by means of the same device. The conventional article feeding device, such as the one heretofore employed to feed the parts for assembly to the automatic assembling machine, is constructed to feed pallets containing an article or articles in the order of the article assembling steps and feed them successively into shelves of a stocker. But, there is substantial difference between the numbers of the articles contained in the respective pallets, depending upon the shape and the size of the article, and the times required for the respective pallets to become empty are different from each other, so that it is impossible to effect the pallet feeding operation in fully automatic manner, without requiring manual operation.

SUMMARY OF THE INVENTION

It is a first object of the present invention to provide an automatic article feeding system for feeding articles, such as parts for assembly, units or the like to an automatic assembling machine, which includes memory means for previously storing positions and numbers of the articles to be stocked into a stocker, means for feeding pallets each containing an article or articles into the stocker, means for withdrawing one of the pallets from the stocker according to an instruction received from an automatic assembling machine and means for supplying the article contained in the withdrawn pallet to the automatic assembling machine.

It is a second object of the present invention to provide an automatic article feeding system, in order to attain the above-mentioned first object, which includes a first elevator for moving in an upward or downward direction according to addresses attached to the respective shelves of the stocker, first transferring means for transferring a pallet stocked in the shelf to the first elevator when said elevator has come to the position of the shelf having the address where the pallet is to be withdrawn, means for effecting program control of the above-mentioned means according to information processing unit to control said first elevator and said first transferring means and means for sequentially effecting the upward or downward movement of the elevator to the address of the shelf of the stocker, the transfer of the pallet from the shelf to the elevator, the withdrawing of the article from the pallet and the returning of the pallet to the shelf of the stocker.

It is a third object of the present invention, in association with attaining the second object, to provide an automatic article feeding system which includes means for storing information concerning an empty shelf or shelves of the stocker and number of an article or articles contained in a pallet and/or display means for displaying the information stored in said storing means, connected to the information processing unit for controlling said first elevator and said transferring means.

It is a fourth object of the present invention to provide an automatic article feeding system for feeding the pallets into the stocker to temporarily stock them in the stocker and supplying the articles contained in the pallets to the automatic assembling machine according to an instruction received from the automatic assembling machine, which includes means for conveying a plurality of pallets simultaneously to the stocker, an information processing unit for searching shelves of the stocker to detect an empty shelf or shelves of the stocker, means for feeding the respective pallets into the empty shelves and memory means for storing an address or addresses of a shelf or shelves in which the pallet or pallets have been stocked.

It is another object of the present invention to provide, in order to attain the above-mentioned fourth object, a mechanism for feeding the pallet into the empty shelf of the stocker, which includes a conveying car for conveying a stack of a plurality of pallets, means for separating respective pallets from the stack, a second elevator and second transferring means for feeding the separated pallet into the empty shelf of the stocker.

It is a further object of the present invention to provide a pallet discharging mechanism for discharging empty pallets from said stocker and loading the empty pallets one on the other onto the conveying car.

BRIEF DESCRIPTION OF THE DRAWINGS

FIG. 8 is a block diagram showing an article feeding system, according to the invention.

FIG. 10 is a flow chart showing the steps of supplying parts to be assembled from the stocker to an automatic assembling machine.

DETAILED DESCRIPTION OF THE PREFERRED EMBODIMENTS

Firstly, the construction of the device embodying the present invention will be described.

Figure 1:
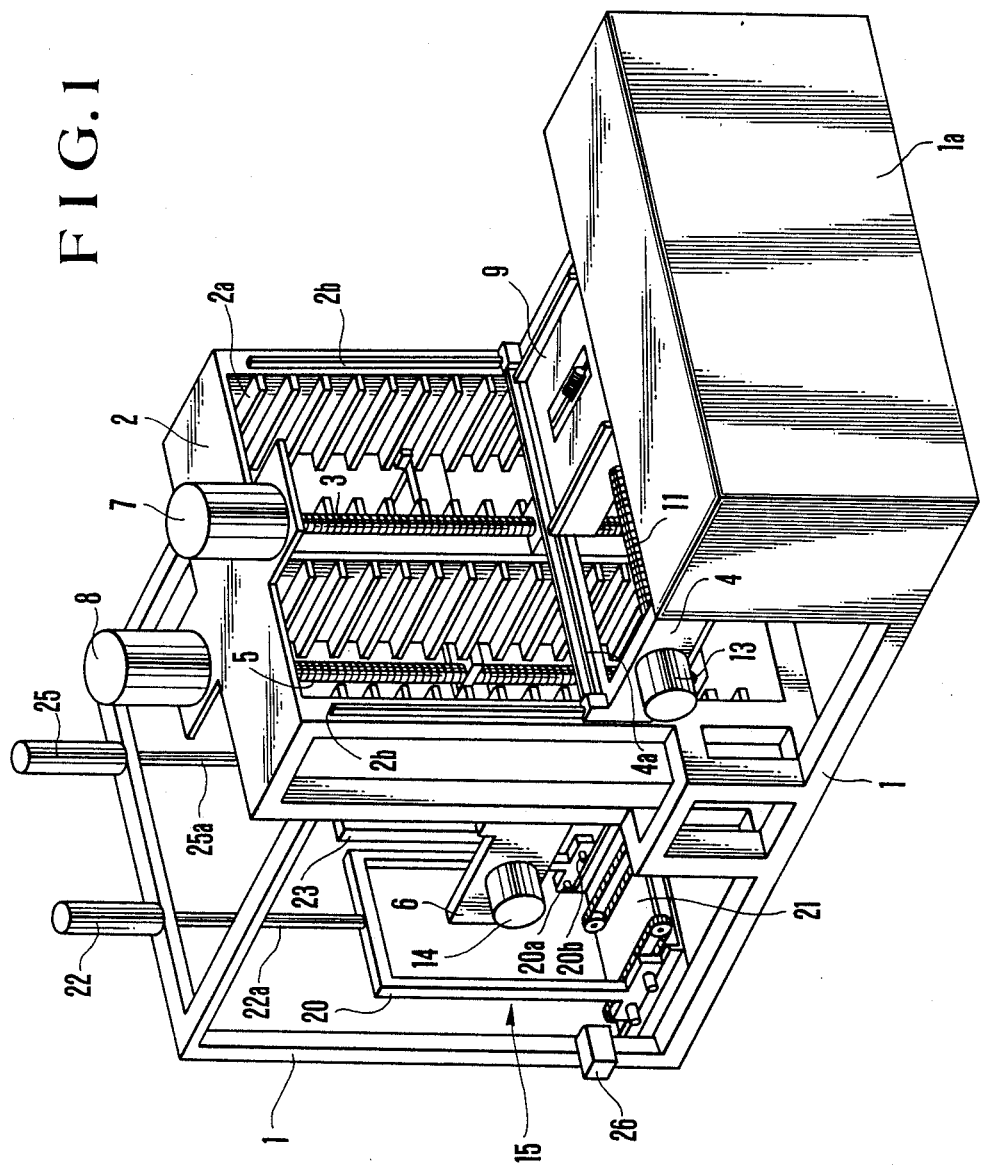
FIGS. 1 and 2 illustrate an automatic article feeding device embodying the present invention.
Figure 2:
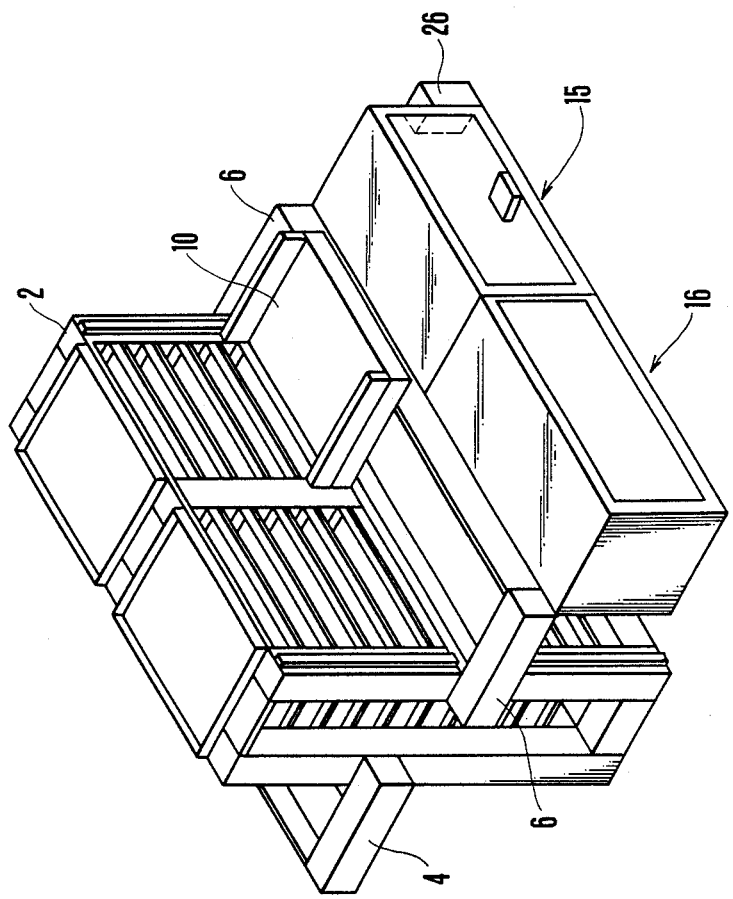

FIG. 1 is a perspective view showing the device seen from the side of a bench and FIG. 2 is a perspective view showing the device seen from the opposite side, that is, the article feeding and discharging side.

Figure 3:
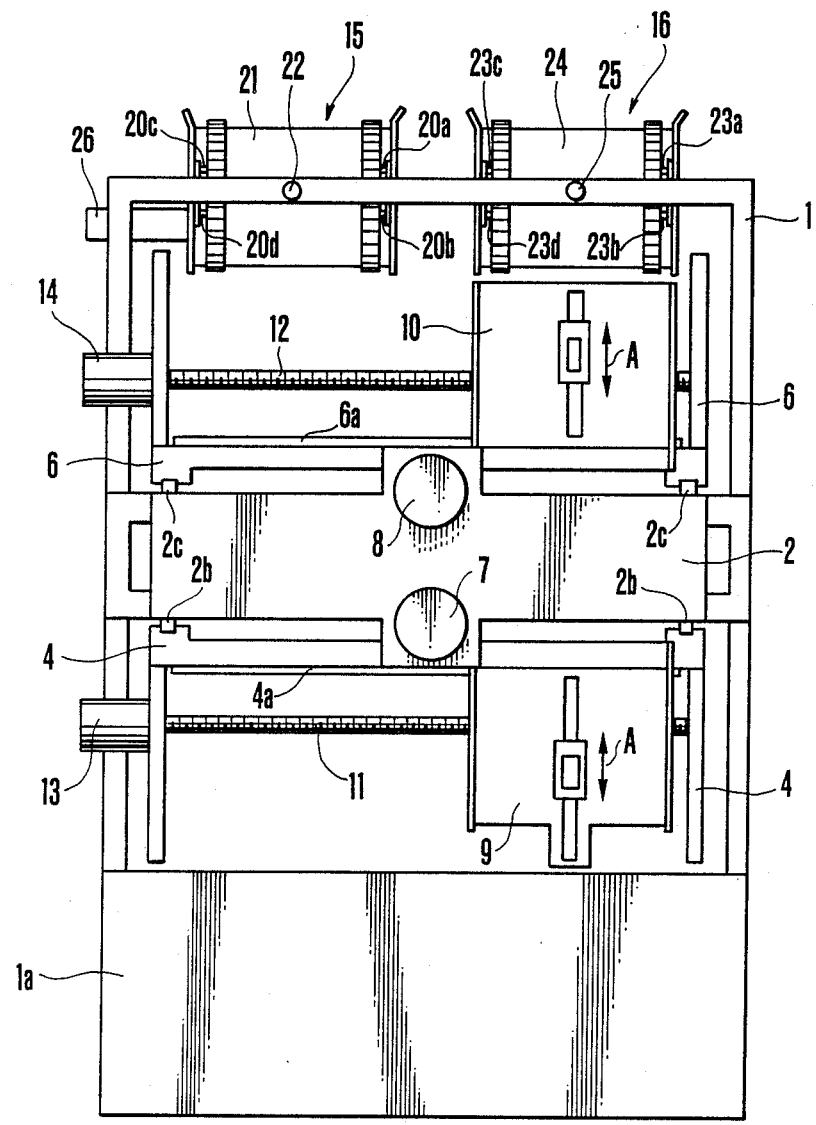
FIG. 3 is a plan view of the device shown in FIG. 1.

In the drawings, the numeral 1 designates a frame and the numeral 2 designates a stocker which is arranged at a substantially central position of said frame 1. The stocker 2 includes a plurality of shelves 2a. The shelves of the stocker have addresses 2a1, 2a2, 2a3 . . . , from the right upper end shelf to the lower end shelf in FIG. 1. A first elevator 4 which can be moved in an upward or downward direction by means of a feed screw 3 is arranged at one opening portion of the stocker 2, while a second elevator 6 which can be moved in upward or downward direction by means of a feed screw 5 is arranged at the other opening portion of said stocker 2 (FIG. 1). Motors 7 and 8 for driving the feed screws 3 and 5, respectively, are arranged on the top plate of said stocker 2, and guide rails 2b and 2c for guiding the first and second movable stations 4 and 6 are arranged on both side edges of the opening portions of said stocker 2 (FIG. 3). The first and second elevators 4 and 6 have female screw portions formed thereon which are held in threaded engagement with the feed screws 3 and 5, respectively, and have portions which are slidable along said guide rails 2b and 2c and guided thereby. Thus, the first and second elevators 4 and 6 are moved in upward or downward direction by the motors 7 and 8, respectively.

The elevators 4 and 6 have tables 9 and 10 movably mounted thereon, respectively, and these tables are horizontally movable along the opening portions of the stocker 2. The elevators 4 and 6 further include guide rails 4a and 6a for guiding said tables 9 and 10, respectively, feed screws 11 and 12 for moving said tables 9 and 10, respectively, and motors 13 and 14 for driving said feed screws 11 and 12, respectively.

A bench 1a is arranged at one side of the first elevator 4 opposite to its side confronting to the stocker 2. An automatic assembling machine, i.e. an assembling robot, which is indicated by a block 31 in FIG. 8, is mounted on said bench to effect the assembling operation of the parts for assembly.

A pallet feeding device 15 for feeding loaded pallets, in which parts for assembly have been already loaded, onto the table 10 is arranged at one side of the second elevator 6 opposite to its side confronting the stocker 2, and a pallet discharging device 16 for receiving empty pallets from said table 10 is arranged at the same side of the second elevator 6.

The tables 9 and 10 have pallet transferring devices which are movable in the direction at right angles to the feed screws 11 and 12 as shown by the arrows A in FIG. 3. These pallet transferring devices serve to transfer the pallets between the stocker 2 and said tables 9 and 10, between the table 10 and the pallet feeding device 15 and between the table 10 and the pallet discharging device 16. The transferring device will be hereinafter explained in more detail, with reference to FIG. 7.

The elevators, the tables and the pallet transferring devices constitute pallet operating devices. More particularly, the first elevator 4, the first table 9 and the first pallet transferring device constitute the first pallet operating device, which is arranged at one opening portion of the stocker 2, while the second elevator 6, the second table 10 and the second pallet transferring device constitute the second pallet operating device, which is arranged at the other opening portion of the stocker 2.

Figure 4:
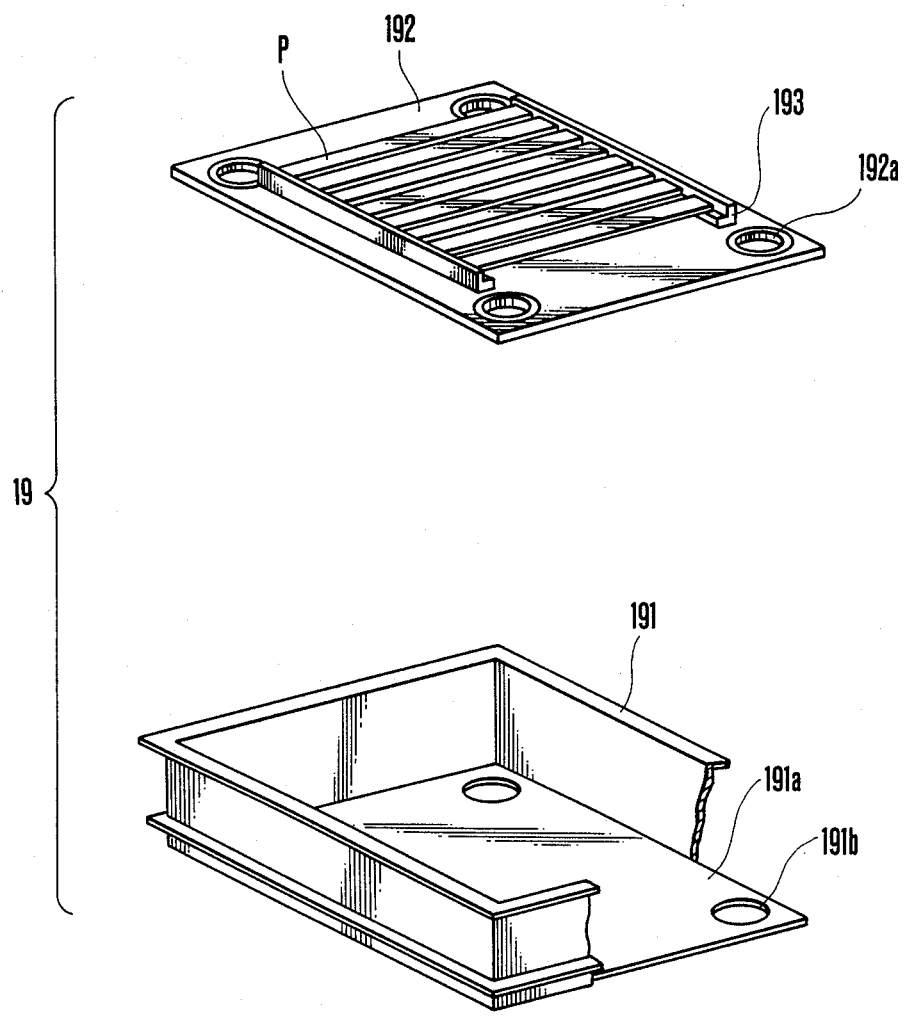
FIG. 4 is an exploded perspective view of a pallet.

The detailed construction of the pallet 19 to be put into the stocker 2 is shown in FIG. 4. As shown in FIG. 4, the pallet 19 consists of a box-like casing 191 and a magazine 192 housed in said casing, and said magazine 192 has positioning member 193 for positioning the parts for assembly p. The casing 191 has a bottom plate 191a. The bottom plate 191a and the magazine 192 have positioning through-holes 191b and 192a, respectively. The table 9 has pins which are arranged to be projected upwardly to fit into said holes 191b and 192a.

The pallet feeding device 15 includes a vertically movable frame 20 and a pallet feeding base 21. The vertically movable frame 20 constitutes a pallet separating mechanism which serves to separate a pallet from a stack of the pallets placed on the base 21 and transfer the pallets one by one from the lowest pallet onto the table 10.

Figure 5C:
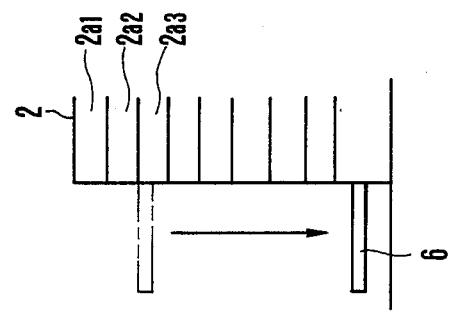
FIGS. 5A, 5B and 5C illustrate the steps of conveying a stack of pallets by means of a conveying car and feeding the respective pallets into a stocker.
Figure 5B:
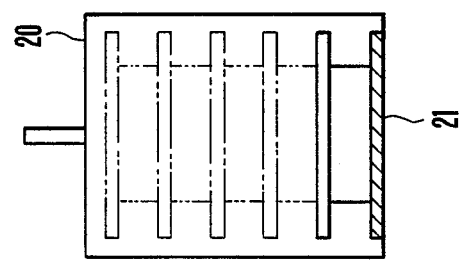
Figure 5A:
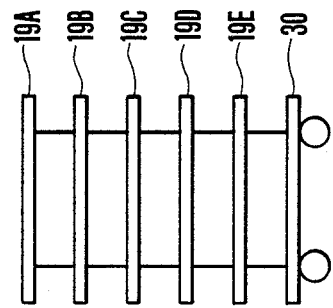

As shown in FIG. 5, the pallets are placed on a conveying car 30 to form a stack of five stages of pallets 19A, 19B, 19C, 19D, 19E thereon, and said conveying car 30 is laid alongside the vertically movable frame 20. The stack of the pallets 19A-19E is transferred from the conveying car 30 onto the pallet feeding base 21. An air cylinder 22 for moving the vertically movable frame 20 in an upward on downward direction is mounted on the frame 1 and has a rod 22a connected to said frame 20.

The pallet discharging device 16 also includes a vertically movable frame 23 and a pallet discharging base 24. The vertically movable frame 23 constitutes a pallet stacking mechanism. An air cylinder 25 for moving the vertically movable frame 23 in an upward or downward direction is mounted on the frame 1 and has a rod 25a connected to said frame 23.

A detector 26 (for example a bar code reader) is arranged at the side of the pallet feeding base 21 of the pallet feeding device 15 to effect identification of the content of the pallet and the output signal of said detector is fed to an information processing unit for controlling the feeding apparatus according to the present invention and the robot. The information processing unit serves to control the motors 7, 8, 13 and 14, the air cylinders 22 and 25, the pallet transferring devices etc., in accordance with the input signals fed from various detectors arranged at the various points of the feeding apparatus (for example, the signals fed from the pallet detector arranged in the stocker and the input signals fed from the robot control device, etc.).

The operation of the individual mechanisms shown in FIGS. 1–5 is explained in the co-pending application (U.S. Ser. No. 887,730 filed July 17, 1986) which was assigned to the applicant of this application. Therefore the detailed explanation of the operation is omitted in this specification.

Now, a description will be given to the mechanism for feeding the pallets, one by one to the empty shelf of the stocker, with reference to FIGS. 6A and 6B.

Figure 6A:
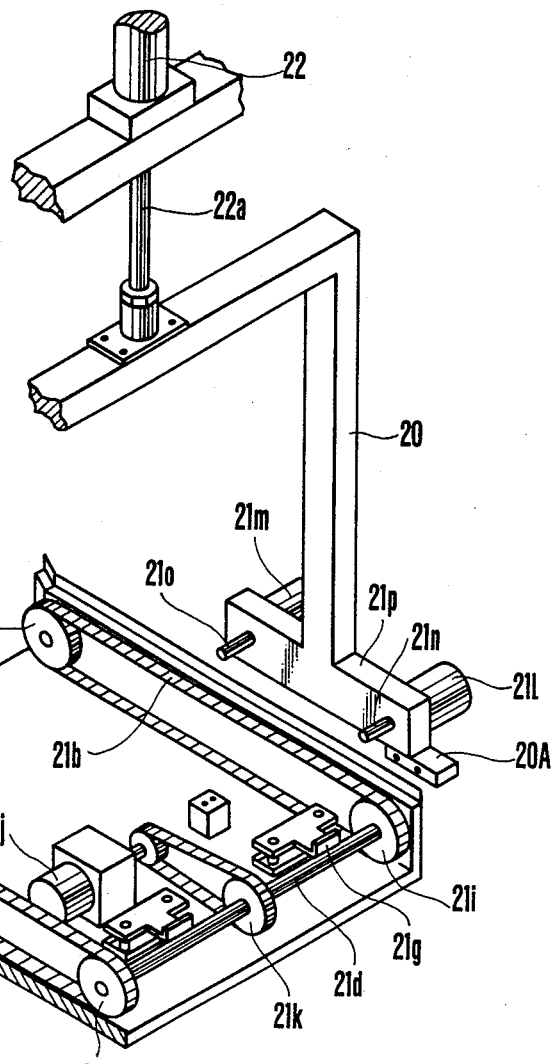
FIG. 6A is a perspective view, partly broken, of a pallet separating mechanism for successively separating a pallet from a stack of the pallets loaded on a pallet supplying table and feeding the separated pallet onto a second table.
Figure 6B:
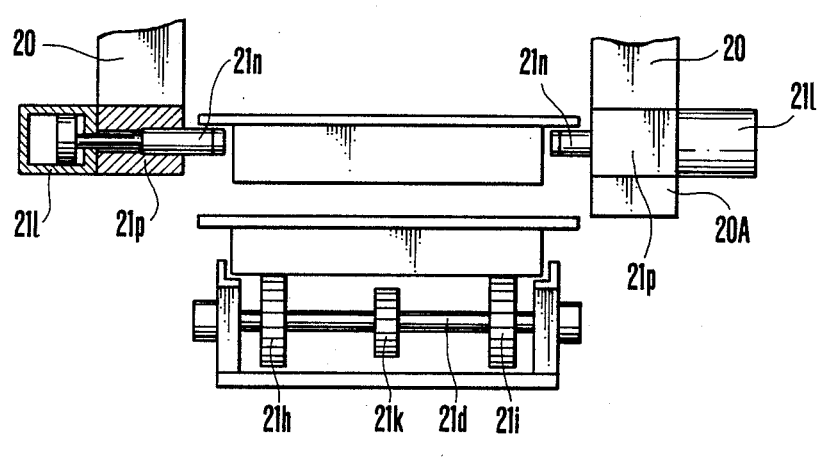
FIG. 6B is a front view of a part of the separating mechanism shown in FIG. 6A in which one of the pallets has been separated.

In FIGS. 6A and 6B, the numeral 20 designates the vertically movable frame for feeding the pallets as shown in FIG. 1. The frame has a fork-shaped construction and the pallet feeding base 21 is positioned below said frame 20. The frame 20 is moved in an upward or downward direction in the frame 1 by means of the air cylinder 22 and the rod 22a. The pallet feeding base 21 has a pair of chain conveyor belts 21a and 21b, which are held in a stretched state between pulleys 21e, 21f and 21h, 21i fixed on rotary shafts 21c and 21d which are journalled in said base 21. The belts 21a and 21b are driven by a motor 21j which is fixedly mounted in said base and drives said rotary shaft 21d through a pulley 21k and a pulley fixed to a rotating shaft of said motor. A supporting frame 21p is fixed to the end of each leg of the vertically movable fork-shaped frame 20, and pallet holding pins 21n and 21o are slidably supported by said supporting frame 21p. Air cylinders 21l and 21m are fixedly supported by said frame 21p to drive said pins 21n and 21o so that these pins are projected inwardly of the frame 20 or retracted into the frame. Although only one leg of the frame 20 is shown in FIG. 6A, the same pins and the cylinders for driving said pins are arranged on the other leg of the fork-shaped frame 20. A pallet stopper 21q is arranged in said base 21 and it is movable in an upward or downward direction to project into the pallet feeding plane or retract therefrom.

Figure 7:
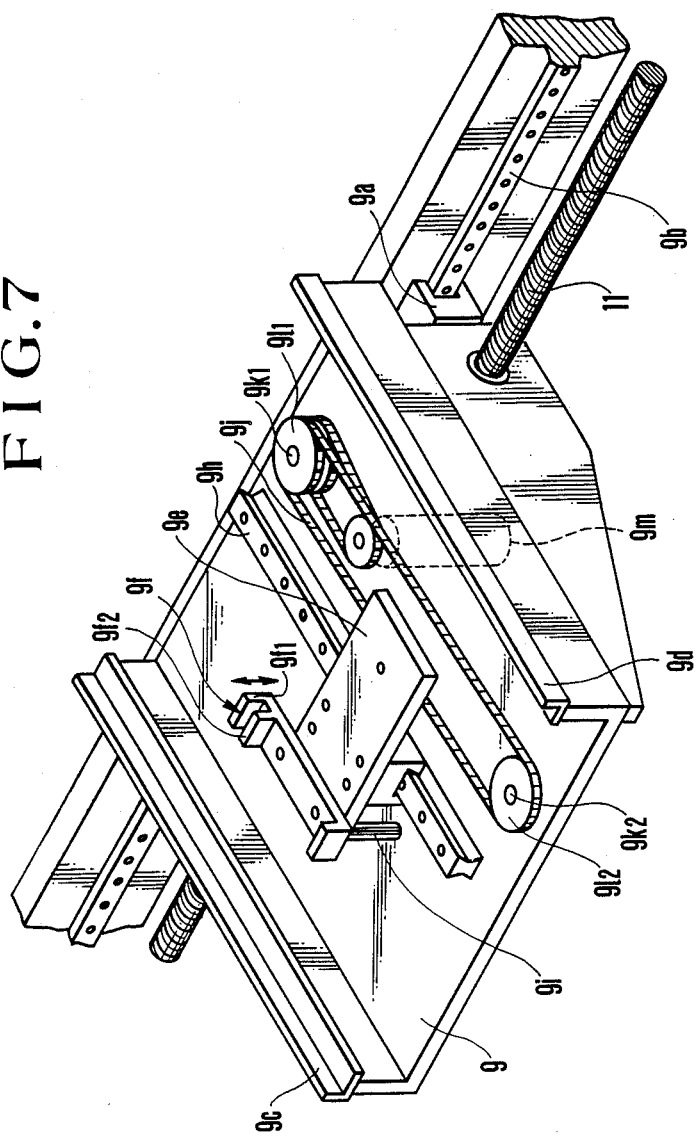
FIG. 7 is an explanatory perspective view of a transferring mechanism for transferring a pallet from a table into a shelf of a stocker.

Now, the construction of the pallet transferring device will be explained, with reference to FIG. 7. The first and second transferring devices have the same construction and, therefore, only the first transferring device will be explained. In FIG. 7 the numeral 9 designates the first table shown in FIG. 3, which is held in threaded engagement with the feed screw 11 which is horizontally supported in the first elevator 4. The table 9 has guide members 9a (only one of which is shown in FIG. 7) attached to the side thereof which is in slidable engagement with a guide bar 9b to hold the table 9 in its horizontal position. Pallet guides 9c and 9d are fixed on the table 9 to prevent the pallet from dropping from the table. A supporting plate 9e is arranged on the table 9 and it is slidably supported on a guide 9e fixed on said table. A pallet catching hook 9f is arranged on said table 9 and it includes hook portions 9f1 and 9f2 which are movable in upward and downward directions, as indicated by an arrow, by means of a cylinder 9i. An endless belt 9j for moving said plate 9e is arranged, in stretched state, between pulleys 9l1 and 9l2 fixed on rotary shafts 9k1 and 9k2 which are journaled on the table 9. The pulley 9k1 is driven by a pulley driving motor 9m through a driving belt.

FIG. 8 is a block diagram showing the control of the operation of the automatic article feeding system according to the present invention.

In FIG. 8, 31 designates the automatic assemblying machine. The article feeding system as shown in FIG. 8 includes first control means 32, second control means 34, pallet detecting means 36, article identifying means 38, information processing unit 40, memory means 42, display means 44 and communicating means 46.

The first control means 32 controls the operation of the motors 7 and 13 for driving the first elevator 4 and the table 9 to control the feeding of the parts to the automatic assembling machine 31.

The second control means 34 includes a control system for controlling the operation of receiving the pallets from the conveying car 30 and feeding them into the shelves of the stocker 2. This second control means 34 controls the operation of the motors 8 and 14 for driving the second elevator 6 and the table 10 and further controls the operation of the air cylinders 22 and 25 for driving the pallet feeding device 15 and the pallet discharging device 16.

The pallet detecting means 36 is attached to the vertically movable frame 20 and it serves to detect whether the pallet has been loaded on the frame or not and generates a detection signal. This pallet detecting means 36 is constructed of a light emitting member, a light receiving member, a photoelectric transducer and the like.

The article identifying means 38 serves to identify the kind of the parts loaded in the pallet. It is constructed, for example, of a bar-code reader which reads a bar code mark attached to each of the pallets. This means is shown in FIG. 1 as the bar code reader 26.

Figure 9:
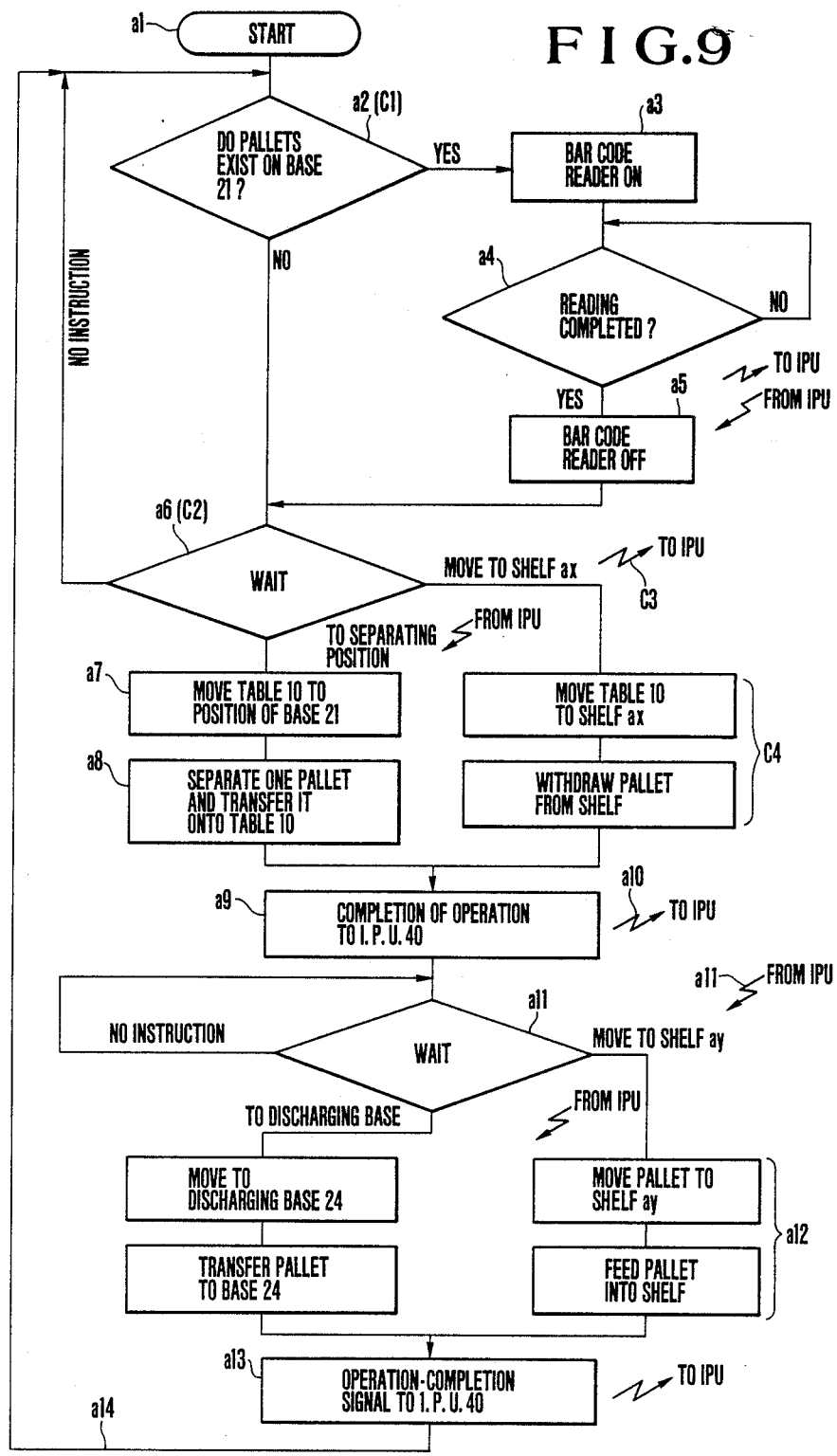
FIG. 9 is a flow chart showing the steps of successively feeding pallets from a conveying car into shelves of a stocker (steps a1–a14) and the steps of successively discharging empty pallets from the shelves of the stocker (steps c1–c4).

The information processing unit 40 connected with the above-mentioned first and second control means and article identifying means through communicating lines, to receive signals from the respective means and send operating signals to the respective means, according to programs, is described with reference to the flow charts as shown in FIGS. 9 and 10.

The memory means 42 serves to store informations regarding existence or non-existence of the pallets in the shelves of the stocker 2 and the number of the parts contained in the respective pallets. That is, the memory means stores the information concerning the existence or non-existence of the pallets in the respective addresses of the shelves of the stocker when the pallets have been fed into the stocker by means of the pallet feeding device 15 and the pallets have been discharged by means of the pallet discharging device 16, and said memory means further stores the information concerning the number of the parts retained in the pallets after the parts have been fed to the automatic assembling machine by the first control means 32.

The control of the information stored in said memory unit 42 is effected on the basis of communicating signals between the first and second control means and the information processing unit.

The display means 44 displays the existence or non-existence of the pallets in the respective addresses of the stocker and the number of the retained parts.

The communicating means 46 permits communication with other means for controlling the supply of parts, such as an automatic storehouse.

The operation of the article feeding system according to the present invention will be explained with reference to the flow charts as shown in FIGS. 9 and 10.

FIG. 9 is a flow chart showing the steps of feeding the pallets from the conveying car 30 into the predetermined shelves of the stocker 2 (Step a1–Step a4).

Step a1:

Firstly, the power source is switched on to supply electric power to the respective means. Then the pallet detecting means 36 starts its operation.

Step a2:

If a stack of pallets exists on the pallet feeding base 21 of the pallet feeding device 15, the existence of the pallets is detected by the signal of the pallet detecting means 36.

Step a3:

When a stack of pallets exists on the feeding base, the article identifying means 38 (bar-code reader) starts its operation to identify the article or articles contained in the pallet according to the above detecting signal.

Step a4:

The article identifying means 38 reads the code number of the pallet and sends the signal (code signal) to the information processing unit 40. The information processing unit 40 contains a record of code numbers of pallets previously stored in its memory means and compares the read-out number with the recorded number. By this step, useless parts are prevented from being fed into the stocker. If the read-out number does not coincide with any of the recorded numbers, the information processing unit issues a signal to display a warning on the display means 44.

Step a5:

If the read-out number coincides with the recorded number, the information processing unit 40 issues a signal indicating the completion of reading and the operation of the article indentifying means is turned OFF.

Step a6: (Wait for instruction for destination)

The second elevator 6 for transferring the pallet 19 from the vertically movable frame 20 into the stocker 2 is located at a position corresponding to either one of the addresses 2a–2an where the previous operation has ended. For example, when it is located at a top shelf 2a1 of the stocker, the information processing unit 40 sends a signal to the second control means 34 to move the second elevator 6 to the feeding position of the feeding device 15.

Step a7:

A driving signal is sent from the second control means 34 to the air cylinder 22, in accordance with the previous step a6, to move the second elevator 6 from the position as indicated by a broken line in FIG. 5C to the position for feeding the pallet of the pallet feeding device as indicated by a solid line in said figure.

Step a8:

The second elevator 6 which came to the feeding position acts to transfer one pallet of the stack of pallets 19A, 19B—placed on the feeding base 21 onto the second table 10. The feeding of the pallet from the stack of pallets on the feeding base 21 is effected in the manner as described below. If five pallets 19A, 19B–19E are placed on the feeding base, the upper four pallets are separated from the bottom pallet, and only the bottom pallet is fed onto the second table 10.

The pallet separating mechanism will be explained, with reference to FIG. 6A and FIG. 6B.

The stack of the five pallets is conveyed by the conveying car 30 and these pallets 19A-19E are transferred together onto the pallet feeding base 21. The pallet stopper 21g is moved upwardly, by an instruction received from the second control unit 34, to stop the movement of the pallet. Then, the vertically movable frame 20 is moved upwardly, by an instruction received from the second control unit.

A limit detector 20A is attached to the lower end of the frame 20 and it serves to detect a limit mark attached to the pallet. When the vertically movable frame 20 makes an upward movement as described above and detects said limit mark of the bottom pallet, the information processing unit 40 receives the detecting signal and then the second control unit 34 issues a signal to operate the cylinders 21l and 21m. Then the pins 21n and 21o are projected inwardly to catch the second pallet 19D from bottom.

After the pallet 19D has been caught by the pins, the vertically movable frame 20 is moved upwardly by the action of the air cylinder 22, so that the upper four pallets 19A-19D are separated from the bottom pallet 19E. After the separation, the pallet stopper 21g is driven downwardly to release the pallet 19E. Then the information processing unit 40 issues an instruction to drive the motor 21j. The rotation of this motor is transmitted through the pulley 21k, the rotary shaft 21d, the pulleys 21h and 21i to the belts 21a and 21b, thereby feeding the pallet 19E onto the second table 10.

Step a9:

When transfer of the pallets onto the second table 10 has been completed, a signal indicating completion of operation is sent from the second control means to the information processing unit.

Step a10:

When the above operation has been completed, the information processing unit searches the existence or non-existence of an empty shelf in the stocker and the address of the empty shelf.

Step a11:

During searching of the empty shelf, the second table 10 is held at the pallet feeding position and held in a state of waiting for instructions for destination. If the address of the empty shelf is decided as the result of searching of the address for the empty shelf effected by the information processing unit in the step a10, the information processing unit sends a signal to the second control means to control the operation of the motors 8 and/or 14 to move the second table 10 to the empty shelf of the stocker.

Step a12:

When the pallet on the table 10 comes to the position of the empty shelf, the pallet is transferred into the empty shelf by the transferring device by an instruction sent from the information processing unit.

Now, the transfer of the pallet 19E into the shelf of the stocker will be explained with reference to FIG. 7. Although FIG. 7 shows the construction of the first transferring device, the second transferring device has the same construction as that of the first transferring device, as explained above. Accordingly, the transferring operation of the second transferring device will be explained with reference to FIG. 7. When the table 10 supporting the pallet has reached the address of the empty shelf as decided by the searching operation, the information processing unit sends an instruction to the cylinder 9i to move the hook 9f downwardly to retract the hook portions 9f1 and 9f2 from engagement with the pallet. Thus the pallet becomes released from the hook 9f and becomes supported by the supporting plate 9e. Then the motor 9m is driven and the rotation of the motor is transmitted through the pulley 91l and the belt to the supporting plate 9e, which is moved along the guide 9h toward the shelf. Thus the pallet 19E is fed into the shelf of the stocker having the address decided by the searching operation.

Step a13:

When the transfer of the pallet into the empty shelf has completed, the information processing unit sends a signal to the memory means, whereby information concerning the pallet fed into the empty shelf is stored in the memory means. Then the information processing unit issues a signal to indicate the completion of the movement of the pallet.

Step a14:

The above steps a2-a13 are repeated and the step is returned from the step a13 to the step a2 by the action of the above-mentioned signal indicating the completion of the movement of the pallet.

Next, the operation of withdrawing the parts for assembly from the respective pallets stored in the stocker 2 will be explained with reference to the flow chart of FIG. 10.

Step b1:

Starts the operation.

Step b2:

The first elevator 4 is located at a position where the previous operation has ended, and the elevator is in the state waiting for the instruction for destination.

Step b3:

The information processing unit 40 receives a request from the assembling robot to supply the same with the part for assembly No. 1.

Step b4:

According to the request from the assembling robot, the information processing unit 40 makes a search of the shelf where the parts for assembly No. 1 is stocked.

Step b5:

The first control means 32 operates according to the operation of searching for the existence of the parts No. 1 in the stocker effected by the information processing unit 40, to actuate the motor 7 and/or 13 to move the elevator 4 to the position of the shelf where said parts are stocked.

Step b6:

When the movement of the elevator 4 has been completed, the information processing unit issues an instruction signal to the first control means 32 to drive the first transferring device, which acts to transfer the pallet containing the parts No. 1 from the shelf of the stocker onto the first table 9.

Step b7:

When the transfer of the pallet onto the table 9 has been completed, the first control means issues an output signal to move the table 9 to a predetermined position, and the motors 7 and 13 operate to move the table 9 to the predetermined position. The predetermined position in question means a position where the assembling robot 31 operates its arm (not shown) to the parts contained in the pallet to catch said parts and convey the same for the assembling operation.

Step b8:

When the table 9 has moved to said predetermined position, the first control means 32 sends a signal to the assembling robot 31 indicating the completion of preparation for assembling operation.

Step b9: (Wait for communication from the robot concerning the completion of operation)

During this step, the parts contained in the pallet on the table 9 are withdrawn by the assembling robot and the elevator 4 waits for a next instruction until the assembling robot has completed its operation to withdraw the parts from the pallet.

Step b10:

When the robot has completed its operation, the assembling robot 31 sends a signal to the first control means to indicate the completion of operation. According to the signal indicating the completion of operation, the information processing unit issues an output signal to the first control means to actuate the motors 7 and 13 to return the table 4 to the original address of the shelf. When the table 4 has been returned to the original shelf, the transferring device acts to return the pallet from the table 4 into the original address of the shelf of the stocker.

Step b11:

When the pallet has been returned to the original shelf of the stocker, a signal indicating the completion of operation of the transferring device is sent from the first control means to the information processing unit.

Step b12:

The number of parts which have been withdrawn from the pallet by the assembling robot is counted by the information processing unit and the number of the retained parts is displayed on the display means.

Step b13:

A sequence of the steps of withdrawing the parts from the pallet to the assembling robot is completed at the end of the step b12. If another part No. 3 is to be withdrawn from the other pallet, a request is sent from the assembling robot to the information processing unit to supply said robot with the parts No. 3. Then the steps as described above are repeated in the same manner.

Next, the discharging of the empty pallets will be described with reference to the flow chart of FIG. 9.

Step c1:

After the parts have been withdrawn from the pallet stocked in the stocker by the steps b1–b13, the pallet in the stocker becomes empty. The pallet which has become empty must be discharged from the stocker to the outside.

In the above step a2, the non-existence of a pallet on the pallet feeding device 15 is detected by the pallet detecting means 36 and a detecting signal indicating the non-existence of pallet is issued thereby.

Step c2 (Step a6): (Wait for instruction for destination)

The pallet discharging elevator 24 is held stopped until it receives an instruction concerning the address of destination.

Step c3:

If the non-existence of the pallet on the pallet discharging device has been detected by the pallet detecting means, the information processing unit 40 issues an output signal indicating an empty pallet in the record of the memory means 42 or an output signal indicating a pallet which has become empty in the record of the memory means 42.

Step c4:

According to the signal of searching the empty pallet in the above step c3, the second control means 34 issues an output signal to drive the motors 8 and 14 to move the second elevator 6 to the address of the empty pallet in the stocker. Then the empty pallet is transferred by the pallet transferring device to the elevator 6. The construction and the operation of the pallet transferring device are the same as those of the device as explained with reference to FIGS. 6A and 6B. After the empty pallet has been transferred to the discharging elevator 24, it is moved to the position where the empty pallets are loaded onto the conveying car.

It will be understood that the present invention provides an automatic article feeding system for feeding articles from the stocker to the automatic assembling machine in which the existence or non-existence of the article or articles and the number of the articles are stored momently in the memory means, so that it is possible to supply the article to the automatic assembling machine, without delay, according to the request received from the automatic assembling machine and consequently, it is possible to effect a completely automated article feeding operation requiring no operator.

According to the present invention, the number of shelves of the stocker can be increased in accordance with the storing capacity of the memory means, so that it can meet the request for supplying many kinds of parts, units or the like from the automatic assembling machine. Consequently, the automatic assembling machine is adaptable to the assembling operation of many parts for assembling large machine. The first table can be moved in an upward or downward direction by means of the first elevator and also moved in the horizontal direction by means of the transferring mechanism including the motor, the feed screw or the like, so that it can meet the request for feeding many kinds of parts, units or the like.

When the articles are fed into the stocker, many pallets can be conveyed together by means of the conveying car and the pallets are fed one by one into the empty shelf of the stocker, so that the operation of stocking the articles into the stocker can be effected in a completely automatic manner. The kind of article is read by the article identifying means and the article is fed into the searched address of the shelf by means of the second elevator, the second horizontally transferring means including the motor, the feed screw, the second table or the like. The kind of article and the address of the article stocked in the stocker are stored in the memory means. Accordingly, a complete feeding and stocking system which can supply a requested article to the automatic assembling machine, without delay, can be obtained.

What is claimed is:

1. An article storing apparatus for supplying articles to an automatic assembling machine, comprising:
   pallets for containing the articles therein;
   stockers for housing said pallets in a stacked directly atop each other relationship, said stockers including a plurality of stages and a plurality of columns, wherein each one of said stages has an inlet for receiving a pallet, and an outlet through which said pallet exits toward the automatic assembly machine;
   means for separating a predetermined number of pallets from said stack of pallets, said separating means including a base for receiving the stacked pallets, means for securing a plurality of stacked pallets and leaving said predetermined number of pallets on said base, means for moving said pallets held by said securing means in a vertical direction, and means for horizontally transferring said predetermined number of pallets remaining on said base;

shifting means for moving said predetermined number of pallets in a horizontal direction to a position corresponding to a predetermined column of the stocking portions of said stockers;

first transferring means for transferring said pallets from said inlet of said stocker stage to within said stockers;

second transferring means for pulling said pallets in said stockers to the exits of said stages for supplying the articles to the automatic assemblying machine;

memory means for memorizing whether said pallets are within each stage and the number of articles within said pallets; and information processing means for detecting an operating state of said separating means, shifting means, first and second transferring means and memory means, and controlling an operation of each said means, for supplying the articles within said pallets to the automatic assemblying machine according to an assembling order of the automatic assembling machine, and for transmitting the number of articles remaining within said pallets to said memory means.

2. An automatic article feeding system according to claim 1, in which said separating means further includes:

means for detecting the position of the pallet retained on the base, said holding means being actuated by a signal produced by said detecting means.

3. An automatic article feeding system according to claim 1, further comprising:

means for arresting the pallet on said base;

said arresting means including a stopper for arresting the bottom pallet of the stack on said base; and means for driving said stopper, said driving means being actuated by an instruction received from said information processing means.

4. An automatic article feeding system according to claim 1, in which said transferring means includes:

a plate movable on said table;

means for driving said plate;

means held on said plate for arresting the pallet to said plate; and means for actuating said arresting means.

5. A device for stocking articles comprising:

a stocker having stocking portions for stocking a plurality of pallets stacked directly atop each other for containing at least one article;

means for separating a predetermined number of pallets from the stack of pallets;

pallet detecting means for detecting whether there is a pallet on said separating means and issuing a detecting signal;

an elevator arranged adjacent said stocker to move the pallets received from the separating means;

means for identifying the kind of article in the pallet and issuing an identifying signal;

memory means for storing the kinds of articles stocked in said stocker; and information processing means for controlling rewriting of the stored information of said memory means according to the idenfifying signal, and for receiving the detecting signal from said pallet detecting means and searching for and then transferring the pallet to an empty storing portion of the stocker.

* * * * *

UNITED STATES PATENT AND TRADEMARK OFFICE
CERTIFICATE OF CORRECTION

PATENT NO. : 4,932,828
DATED : June 12, 1990
INVENTOR(S) : Yoshinobu Katae, et al.

It is certified that error appears in the above-identified patent and that said Letters Patent is hereby corrected as shown below:

COLUMN 10:

Line 4, "pulley 91$\ell$" should read --pulley 9$\ell$1--.

COLUMN 12:

Line 13, "momently" should read --momentarily--.

COLUMN 13:

Line 10, "assemblying" should read --assembling--.

Line 20, "assemblying" should read --assembling--.

COLUMN 14:

Line 30, "idenfifying signal" should read --identifying signal--.

Signed and Sealed this

Thirtieth Day of June, 1992

Attest:

DOUGLAS B. COMER

Attesting Officer

Acting Commissioner of Patents and Trademarks